Patented Jan. 24, 1939

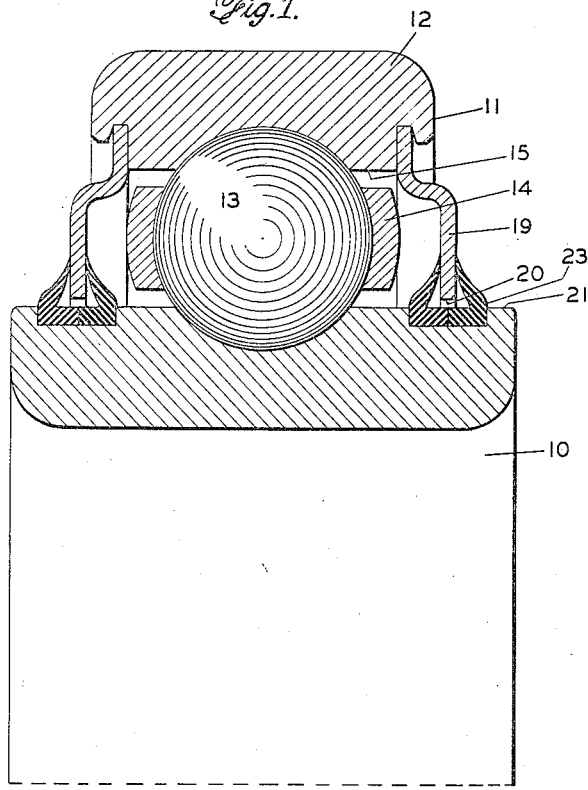
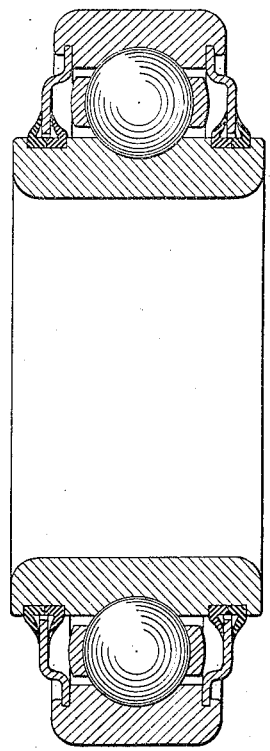
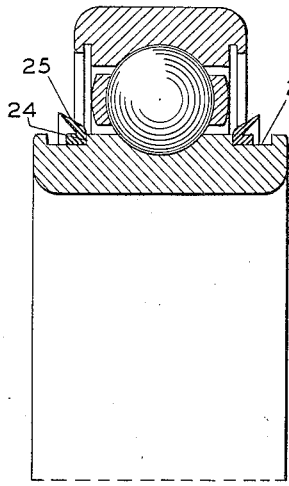
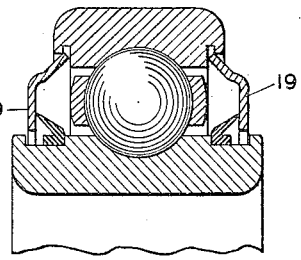
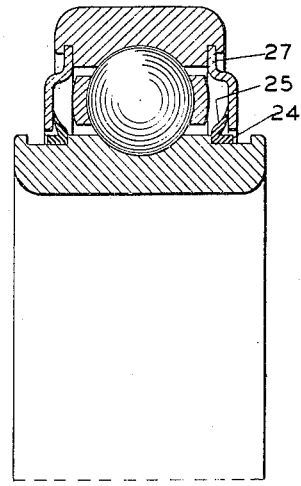

2,144,691

UNITED STATES PATENT OFFICE 2,144,691

BEARING SEAL

Alois H. Schmal, Philadelphia, Pa., assignor to S K F Industries, Inc., Philadelphia, Pa., a corporation of Delaware Application November 13, 1937, Serial No. 174,292

3 Claims. (Cl. 286—5)

This invention relates to enclosures and has for an object to provide a structure of this character in which the closure member is carried by one of the ring members, and in which sealing devices for the free edge of the plate are carried by another ring member.

Another object of the invention is to provide an enclosed bearing of the extended inner ring type in which the closure plates are expanded into grooves formed in the outer race ring member, there being a resilient packing device carried by the extension of the inner ring for engaging both sides of the edge of the center opening in each of the plates.

Another object of the invention is to so form the parts of the bearing of this character that there will be an auxiliary sealing device carried by the inner ring of the bearing inside the sealing plate for yieldingly engaging such plate and preventing the escape of lubricant, and also for affording a sealing on the outside of the plate for preventing entrance of foreign matter into the bearing. An object of this invention also is to form these sealing means of some rubber composition which is impervious to the material of which bearing lubricant is made.

Another object of the invention is to form a bearing of this character preferably having identical plates for its respective sides. Thus all four of such sealing devices may be identical and interchangeable.

In the drawing accompanying this specification, one practicable form of my invention is illustrated, together with what I now regard as the preferred manner of assembling the bearing. In which drawing:

Figure 1 is an enlarged axial section of one side of a bearing constructed in accordance with my invention.

Figure 2 is a central section of a bearing on a smaller scale than what is shown on Figure 1.

Figures 3, 4 and 5 show steps in the assembling portion leading up to the complete bearing of Figure 2, and Figure 6 is an enlarged detail showing the groove construction in the outer race ring member.

The bearing herein illustrated is of the extended inner race ring order; that is, the inner race ring 10 is shown extending on both sides beyond the sides 11 of the outer race ring 12. The bearing is illustrated as having a single row of balls 13 running in raceway grooves formed in the member 10 and 12. The balls 13 are shown carrying a cage member 14. Outwardly of the lands 15, the outer race ring is provided with a groove 16 at each side. The outer side of the groove 17 is shown as tapering and the land outside of this groove is shown as having a tapering surface 18. These tapers being for the purpose of facilitating the insertion of the plates 19 presently to be described.

The plate 19 is shown as having the edge 20 of its central opening of larger diameter than is of the diameter of the land 21 of the inner ring. The inner ring has formed in this land at each side a groove 22. The groove is preferably formed with a cylindrical bottom and with plain radial sides. This groove is for the purpose of receiving a sealing device for the opening 20 in the plate 19. In the present illustration this device comprises a pair of identical, flexible and resilient members 23, which may be formed of rubber composition or synthetic rubber which is resistant to the lubricant which will be packed in the bearing and which is also resistant to oils and other substances to which the outer side of the bearing may be exposed. These members 23 are preferably formed with cylindrical inner faces adapted to engage the bottom of the groove 22, and have square corners for engaging the side walls of the groove.

The base portions 24 of these members are preferably of such dimension that when both of the members of the pair are seated in a groove they will snugly fit into it.

These members are formed with outwardly directed flanges 25, which are wide at their bases where they are carried by the base 24, but which taper gradually into thin lips for engaging the sides 19.

In assembling the bearing the inner and the outer race ring members, the set of balls and cage will be brought together in some suitable or well known manner, after which the innermost members of each of the pair of sealing devices 23 will be placed in the inner sides of the grooves 22. See Figure 3 of the drawing. Next the two plates 19 will be brought into position. The outer edge of each of these plates is adapted to easily clear the face 26 of the land outside of the groove 16, the inner surface of the plate resting against the outer face 27 of the land 15, which face is a continuation of the side face of the groove 16. The plates being in a position shown in Figure 4, preferably with the lips of the extensions 25 of the sealing members resting slightly against the inner edges. Pressure is then simultaneously applied to both of the plates 19, forcing them inwardly and at the same time expanding their outer edges into the groove 16. The outer edge of the plate is then closed against the face 27. The end 25 of the sealing member is bent out of its original position and into a position which has close sealing engagement with the inner edge of the plate, but owing to its yielding ability will exert very little friction to the bearing. The parts are now in the position shown in Figure 5. I have found it preferable to so proportion the parts that when the plate at each side and its inner sealing member 23 have been brought to position, the outer edge of the base portion 24 of the sealing member will be at about the center of the groove 22, and that the center plane of the plate will also be at about that position.

The next step in the operation is to apply the outer sealing member 23 of each pair, Figure 2. This may be done by hand or by some suitable implement. The elasticity and resiliency of the ring making it feasible to slip it over the land 21, where its base portion 24 will snap into the unoccupied portion of the groove 22 and its extending flange 25 will press against the outer surface of plate 19.

My invention has been described in but one form, yet it is obvious that there are many forms and many applications. The pair of rings are shown one carrying the plate and the other ring has been formed with a groove, in which are seated a pair of resilient members. These members engage the sides of the plate at an appreciable distance from its edge.

Having thus described my invention what I claim and desire to secure by Letters Patent is:

1. The combination with a pair of rings disposed one within the other, of a plate carried by one of the rings and projecting toward the other ring, the latter ring having a groove in its perimeter formed with substantially radial sides, flexible and resilient means formed of rubber composition or synthetic rubber which is resistant to the lubricant which may be on the device, this means being seated in the groove, engaging the bottom of the groove and having corners for snugly engaging the side walls thereof, and being formed with outwardly directed tapering rings, tapering gradually into thin lips resiliently engaging the sides of the plate.

2. The combination with a pair of rings disposed one within the other, of a plate carried by one of the rings and projecting toward the other ring, the latter ring having a groove in its perimeter formed with substantially radial sides, a pair of identical, flexible and resilient members formed of rubber composition or synthetic rubber which is resistant to the lubricant which may be on the device, these members having corners for engaging the side walls of the groove, the base portion being of such dimension that when both of the members of the pair are seated in the groove they will snugly fit it, the base members being each formed with an outwardly directed tapering rim, tapering gradually into a thin lip resiliently engaging the side of the plate.

3. The combination with a pair of rings disposed one within the other, of a plate carried by the outer ring and projecting toward the inner ring, the latter ring having a groove in its perimeter formed with substantially radial sides, a pair of identical, flexible and resilient members formed of rubber composition or synthetic rubber which is resistant to the lubricant which may be on the device, these members having corners for engaging the side walls of the groove, the base portion being of such dimension that when both of the members of the pair are seated in the groove they will snugly fit it, the base members being each formed with an outwardly directed tapering rim, tapering gradually into a thin lip resiliently engaging the side of the plate.

ALOIS H. SCHMAL.